United States Patent
Murakami et al.

(10) Patent No.: US 7,950,725 B2
(45) Date of Patent: May 31, 2011

(54) REINFORCED STRUCTURE FOR CABIN OF WORKING MACHINE

(75) Inventors: Yoshiaki Murakami, Hiroshima (JP); Keiji Yamamoto, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 173 days.

(21) Appl. No.: 12/488,883

(22) Filed: Jun. 22, 2009

(65) Prior Publication Data

US 2010/0032984 A1 Feb. 11, 2010

(30) Foreign Application Priority Data

Aug. 9, 2008 (JP) ................................. 2008-206466

(51) Int. Cl.
*B62D 33/06* (2006.01)
(52) U.S. Cl. ............................... 296/190.03; 296/190.08
(58) Field of Classification Search ............. 296/190.03, 296/187.03, 190.01, 190.08
See application file for complete search history.

(56) References Cited

U.S. PATENT DOCUMENTS 7,665,801 B2 * 2/2010 Lee ........................... 296/193.03

FOREIGN PATENT DOCUMENTS

| JP | 2004-345486 | 12/2004 |
|---|---|---|
| JP | 2007-69822 | 3/2007 |

* cited by examiner

*Primary Examiner* — Joseph D Pape
(74) *Attorney, Agent, or Firm* — Oblon, Spivak, McClelland, Maier & Neustadt, L.L.P.

(57) ABSTRACT

A reinforced structure for a cabin of a working machine is disclosed, which comprises a cabin, a boom installed along the cabin, and a reinforcing member provided for the cabin. The cabin includes front pillars, upper pillars and rear pillars. The reinforcing member includes a first member located longitudinally between upper ends of the front and rear pillars located on the working apparatus side of the cabin, the first member being fixed to the upper pillar located on the same side, and a second member, one end of the second member being fixed to an intermediate position of the first member, and the other end thereof being fixed to the other upper pillar.

5 Claims, 6 Drawing Sheets

REINFORCED STRUCTURE FOR CABIN OF WORKING MACHINE

BACKGROUND OF THE INVENTION

1. Field of the Invention

The present invention relates to a reinforced structure for a cabin of a working machine such as a hydraulic excavator.

2. Description of the Related Art

In this type of a working machine, a relatively large opening is formed in a box-shaped cabin in order to ensure a visual field as wide as possible during a work. On the other hand, in the case of a large-sized working machine, its weight reaches several ten tons, and therefore it is necessary to ensure sufficient rigidity of the cabin to prevent damage even if such a large-sized working machine falls down.

Various reinforced structures have so far been proposed to strengthen the cabin rigidity while ensures the visual field.

For example, in Japanese Patent Laid-Open Publication No. 2004-345486, there is disclosed a reinforced structure wherein frame-like reinforcing members are arranged along pillars which constitute a framework of a cabin.

In Japanese Patent Laid-Open Publication No. 2007-69822, there is disclosed a reinforced structure wherein a first reinforcing member for reinforcing a front edge portion of a roof window and a second reinforcing member for reinforcing the portion from behind the roof window up to a rear window can be combined together selectively in accordance with the weight of a hydraulic excavator.

However, in the case of such a large-sized working machine as weighs several ten tons, a mere additional reinforcement of the cabin framework as in the reinforced structures disclosed in the above patent literatures leaves uneasiness in point of rigidity.

Further reinforcement can be effected by enlarging a reinforcing member, but the material cost and weight increase and the reinforcing member gets into the visual field, thus deteriorating the same field. The reinforcing member disposed along an upper front edge of the cabin is particularly gets into the visual field during a work so as to easily be an obstacle.

Increasing the number of members for reinforcement may be effective, but this is also disadvantageous in point of material cost and weight. Accordingly, it is preferable to constitute a simple reinforced structure which is reduced in the number of members used.

SUMMARY OF THE INVENTION

It is an object of the present invention to provide a reinforced structure for a cabin of a working machine, the reinforced structure being simple, relatively reduced in the number of members used, capable of efficiently reinforcing and protecting an operator more surely even in a large-sized working machine, and further capable of ensuring a sufficient visual field.

In the present invention, a reinforced member is provided for a cabin, the reinforced member being able to directly receive and bear a load applied to sides of the cabin and transmit the load efficiently and dispersedly to front pillars, upper pillars and rear pillars of the cabin.

More specifically, according to the present invention there is provided a reinforced structure for a cabin of a working machine, comprising: the cabin being a box-shaped cabin, the cabin defining a working space for an operator; a working apparatus installed along the cabin and supported so that a longitudinal tilting motion thereof can be controlled; and a reinforcing member provided for the cabin, the cabin comprising: a pair of front pillars vertically disposed on both right and left sides of a front of the cabin; a pair of upper pillars continuous with upper ends of the front pillars respectively and disposed longitudinally on both right and left sides; and a pair of rear pillars continuous with rear ends of the upper pillars respectively and disposed vertically on both right and left sides, wherein the reinforcing member, comprises a first member located longitudinally between upper ends of the front and rear pillars located on the working apparatus side of the cabin, the first member being fixed to the upper pillar located on the same side, and a second member disposed transversely, one end thereof being fixed to an intermediate position of the first member, and the other end thereof being fixed to the other upper pillar.

According to this structure, a principal member is made up of two members which are the first member and the second member, and thus the reinforcing member is of a simple structure comprising a relatively small number of constituent members.

Because the second member is disposed transversely, namely in the width direction of the cabin, one end thereof is fixed to an intermediate position of the first member, and the other end thereof is fixed to the other upper pillar, if the working machine falls down, and loads are applied to the cabin from right and left sides, the second member acts like a support rod which bears the loads.

On the other hand, because the first member is located longitudinally between the upper ends of the front and rear pillars located on the working apparatus side of the cabin, and the first member is fixed to the upper pillar located on the same side, even when the working machine tilts relatively largely and the working machine and the cabin come into contact with each other, the first member can bear the resultant load surely and acts like a beam which supports the second member, making it possible to transmit the load imposed on the second member to each pillar of the cabin efficiently and dispersedly.

Besides, the first member scarcely obstructs the work because it is fixed along the working apparatus-side upper pillar of the cabin which is relatively difficult to get into the visual field during the work. And the second member does not obstruct the work, either, because it is located at an intermediate position of an upper surface of the cabin. Therefore, there is no obstacle to the front and upper front fields of vision of the cabin.

It is preferable that the second member be disposed above an operator seated within the cabin. Since the second member acting like a support rod is thus disposed above the operator, the strength of the cabin is most enhanced especially around the operator. Thus, sufficient safety can be expected.

Preferably, a protective portion is disposed on a front of the first member so as to be positioned between the working apparatus and the cabin when the working apparatus tilts forward to a maximum extent.

The working machine generally tends to easily fall down when the working apparatus tilts forward to a maximum extent. Therefore, because the protective portion continuous with the reinforcing member is positioned between the working apparatus and the cabin in the state, if a hydraulic excavator falls down, the working apparatus strikes against the protective portion before striking against the cabin, and the load of the working apparatus is borne by the reinforcing member. Thus, the working apparatus no longer strikes directly against the front portion of the cabin, the portion being relatively low in rigidity, thus making it possible to protect the cabin more efficiently.

The reinforcing member may be screwed to the cabin removably, and screwed portions of the reinforcing member may be located at both end portions of the first member and both end portions of the second member.

This structure is superior in versatility because the reinforcing member can be replaced in accordance with the size of the working machine. Besides, since the screwed portions are located at both end portions of the first member and second member, the screwed portions which are apt to be low in rigidity can be fixed firmly at a relatively small number of positions.

In this case it is preferable that displacement preventing portions are provided near the screwed portions.

If a load applied to both the reinforcing member and cabin generates shearing force acting on the screwed portions, the displacement preventing portions provided near each of the screwed portions inhibit an excessive displacement of the screwed portions. As a result, it is possible to prevent the shearing of a bolt which tends to be easily sheared.

DESCRIPTION OF THE PREFERRED EMBODIMENT

A preferred embodiment of the present invention will be described below in detail with reference to the drawings. The explanation of the following preferred embodiment is essentially a mere illustration of the present invention and is not intended to restrict the present invention, the object to which the invention is applied, or the use of the invention.

[Structure of Reinforced Structure]

In FIGS. 1 to 6, there is shown a hydraulic excavator (working machine) to which a reinforced structure for a cabin according to the present invention is applied.

Figure 1:
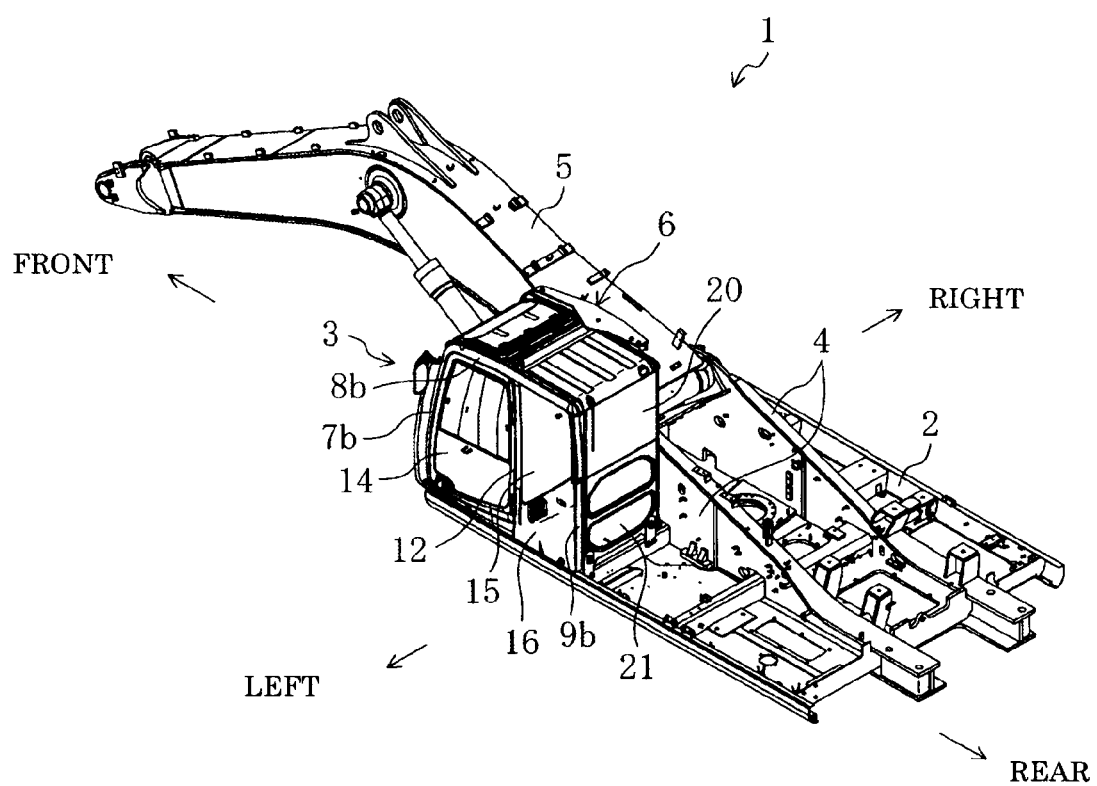
FIG. 1 is a perspective view showing a principal portion of a hydraulic excavator to which the present invention is applied.

FIG. 1 shows the portion of an upper rotating body 1 of the hydraulic excavator. A box-shaped cabin 3 is installed at a front left corner portion of an upper surface of an upper frame 2 of the upper rotating body 1. A boom 5 (working apparatus) is installed at the right side of the cabin 3, and supported so that a tilting motion thereof can be controlled longitudinally by a pair of side stands 4 and 4. A reinforcing member 6 which is the point of the present invention is provided on top of the cabin 3.

Though not shown, a machine body which carries an engine, etc. thereon is installed behind the cabin 3. A lower traveling body is installed below the upper rotating body 1. As far as not mentioned particularly, front, rear, right, left, upper and lower directions represent front, rear, right, left, upper and lower directions of the hydraulic excavator.

(Cabin 3)

Figure 2:
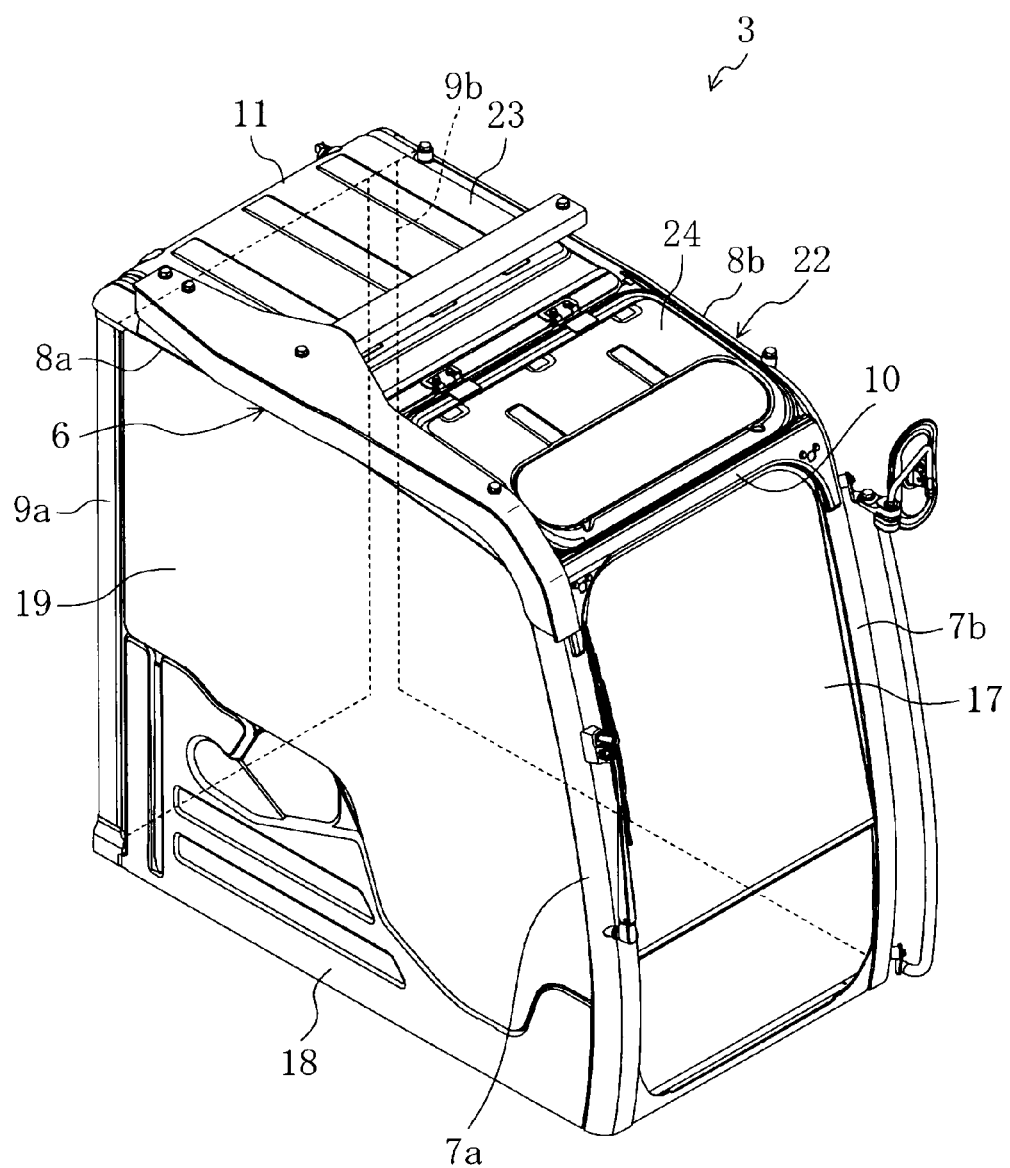
FIG. 2 is a perspective view of a cabin according to the present invention.

FIG. 2 is a perspective view of the cabin 3 as seen from diagonally forward right. The cabin 3 is framed by pillars and cross members which are steel pipes of deformed sections (see FIGS. 3 and 4).

The cabin 3 includes a pair of right and left front pillars 7a, 7b (pillars A) located vertically on both right and left sides of a front of the cabin respectively, a pair of right and left upper pillars 8a, 8b continuous with upper ends of the front pillars 7a, 7b respectively and located longitudinally on both right and left sides respectively, a pair of right and left rear pillars 9a, 9b (pillars C) continuous with rear ends of the upper pillars 8a, 8b respectively and located vertically on both right and left sides respectively, a front cross member 10 continuous with and located transversely between the upper ends of the pair of front pillars 7a and 7b, and a rear cross member 11 continuous with and located transversely between the upper ends of the pair of rear pillars 9a and 9b.

As shown in FIG. 1, a door pillar 12 (pillar B) is mounted at the left side of the cabin 3, the door pillar 12 is continuous with a longitudinally intermediate position of the left upper pillar 8b and located vertically.

A door 14 is fitted in an openable manner in an opening which is defined by both the door pillar 12 and front pillar 7b at the left side of the cabin 3. The door 14 has a door window on an upper side thereof. On the other hand, a left side window 15 and a left side panel 16 are fitted on the upper and lower side of an opening defined by both the door pillar 12 and rear pillar 9b respectively.

A front window 17 is fitted in a front opening of the cabin 3. A right side panel 18 is fitted on a lower side of an opening at the right side of the cabin, and a right side window 19 is fitted on a upper side of the opening. On the other hand, a rear window 20 and a rear panel 21 are fitted on an upper and lower side of an opening at the rear side of the cabin 3 respectively.

A roof window 22 and a roof panel 23 are provided on front and rear side of an opening at the upper side of the cabin 3 respectively. A window cover 24 covers an outer side of the roof window 22 in this embodiment and is supported in an openable manner.

Figure 3:
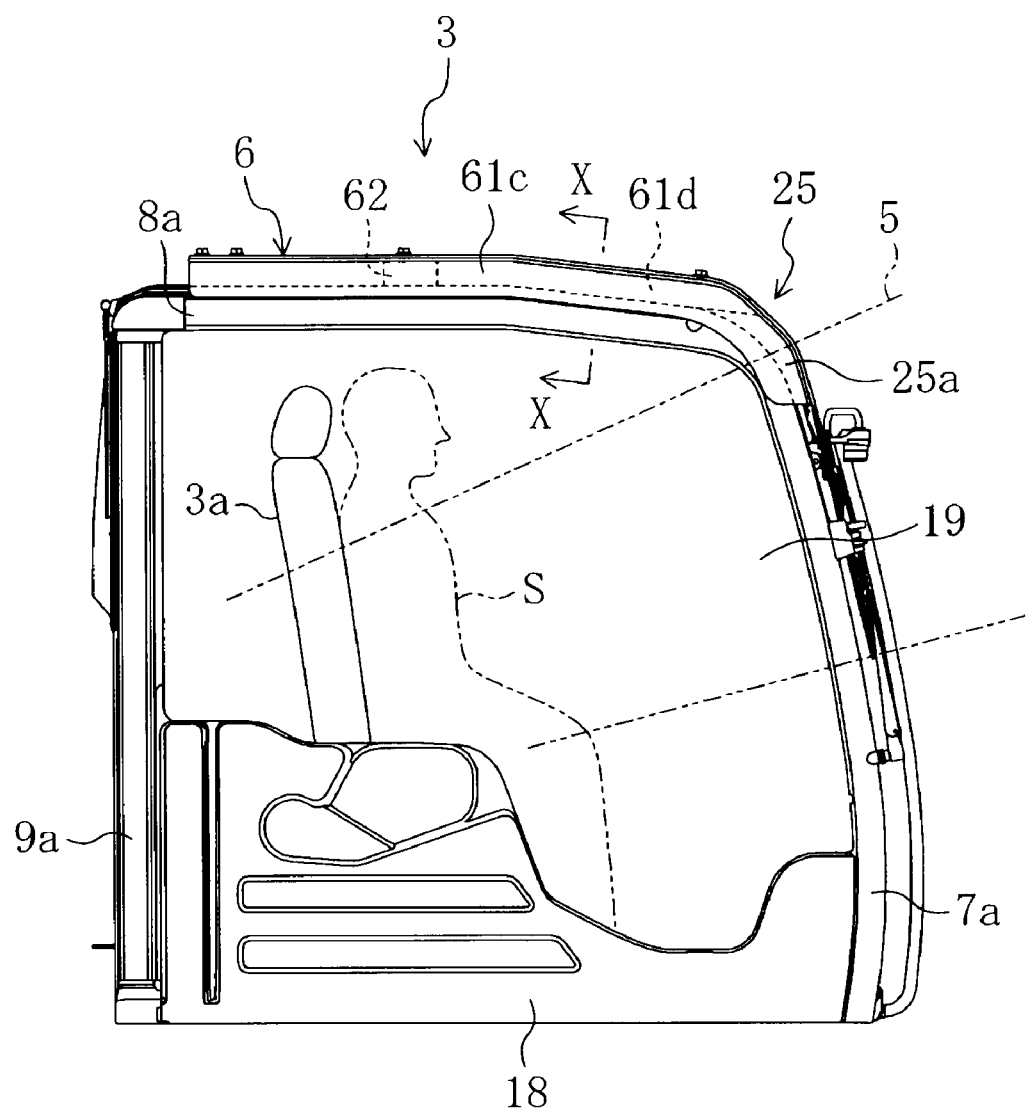
FIG. 3 is a right side view of the cabin.

The cabin 3 thus structured defines a working space for an operator S. As shown in FIG. 3, a seat 3a for the operator S is disposed at a nearly central part of the cabin 3 in the longitudinal direction when seen in the side view in the interior of the working space. The operator S sits on the seat 3a so as to operate a lever, etc. to actuate the boom 5, the upper rotating body 1, and the lower traveling body.

(Reinforcing Member 6)

As noted above, many windows are provided for the cabin 3 to ensure a good visual field during a work, thus making it difficult to strengthen the rigidity of the cabin. On the other hand, even if a large-sized hydraulic excavator weighing several ten tons falls down, it is necessary to ensure safety of the operator S who is working within the cabin 3. Irrespective of hydraulic excavator size, there is generally no great difference in basic structure of the cabin 3. Therefore, it is possible to use members in common if it is possible to reinforce the cabin 3 in accordance with the size.

Having made various studies in view of this point, the present inventors made a great improvement of the reinforcing member 6 which is attached to the cabin 3.

Figure 5:
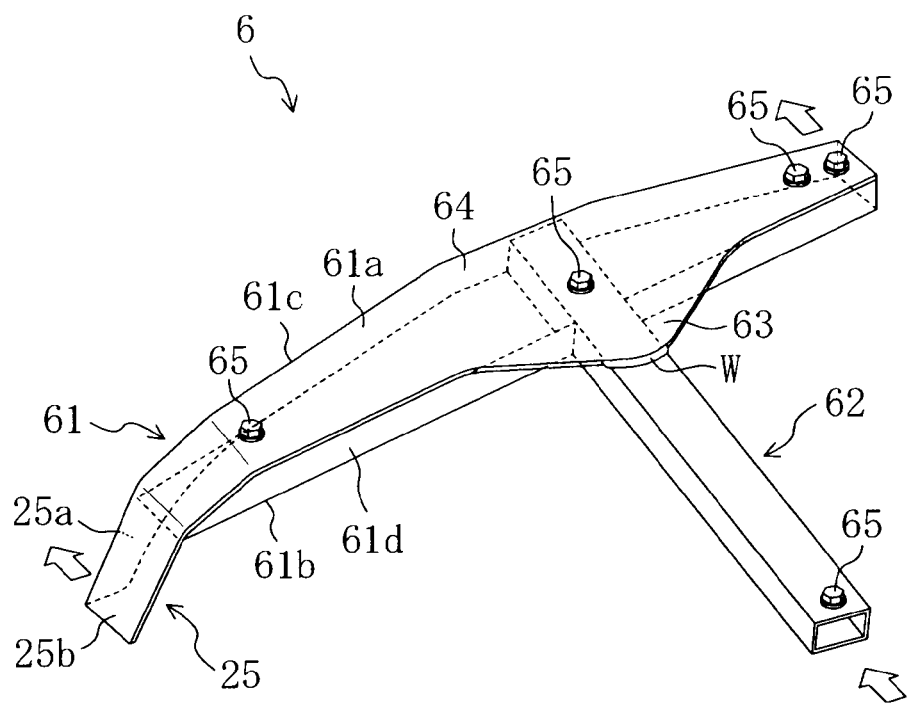
FIG. 5 is a perspective view showing a reinforcing member according to the present invention.
Figure 6:
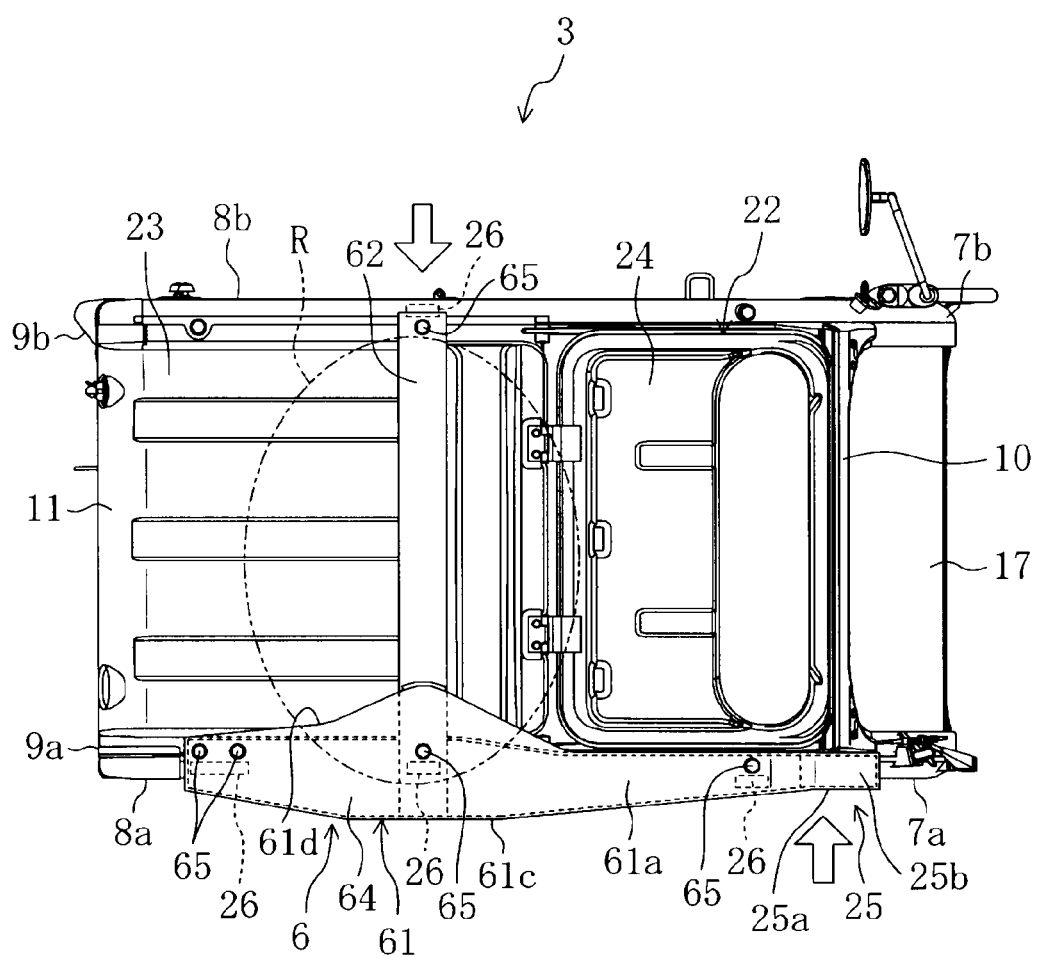
FIG. 6 is a plan view of a cabin according to the present invention.

FIG. 5 shows the improved reinforcing member 6. The reinforcing member 6 according to the present embodiment is an integral structure obtained by combining plural steel members and fixing them by welding. It is substantially T-shaped in a plan view. As shown in FIG. 6, the reinforcing member 6 includes a first member 61 and a second member 62. The first member 61 is mounted on the boom 5 side (right side) of the cabin 3, is located longitudinally between the upper ends of the front pillar 7a and the rear pillar 9a, and fixed to the upper pillar 8a. The second member 62 is located transversely (in the width direction) on the roof panel 23, one end of the second member 62 is fixed to a nearly central part of the first member 61, and the other end thereof is fixed to the upper pillar 8b at the left side of the cabin.

The second member 62 functions like a support rod so as to bear a load applied to the sides of the cabin 3. The first member 61 functions like a beam so as to support the second member 62, and transmit the load imposed on the second member 62 dispersedly to the front pillar 7a, upper pillar 8a and rear pillar 9a.

Figure 4:
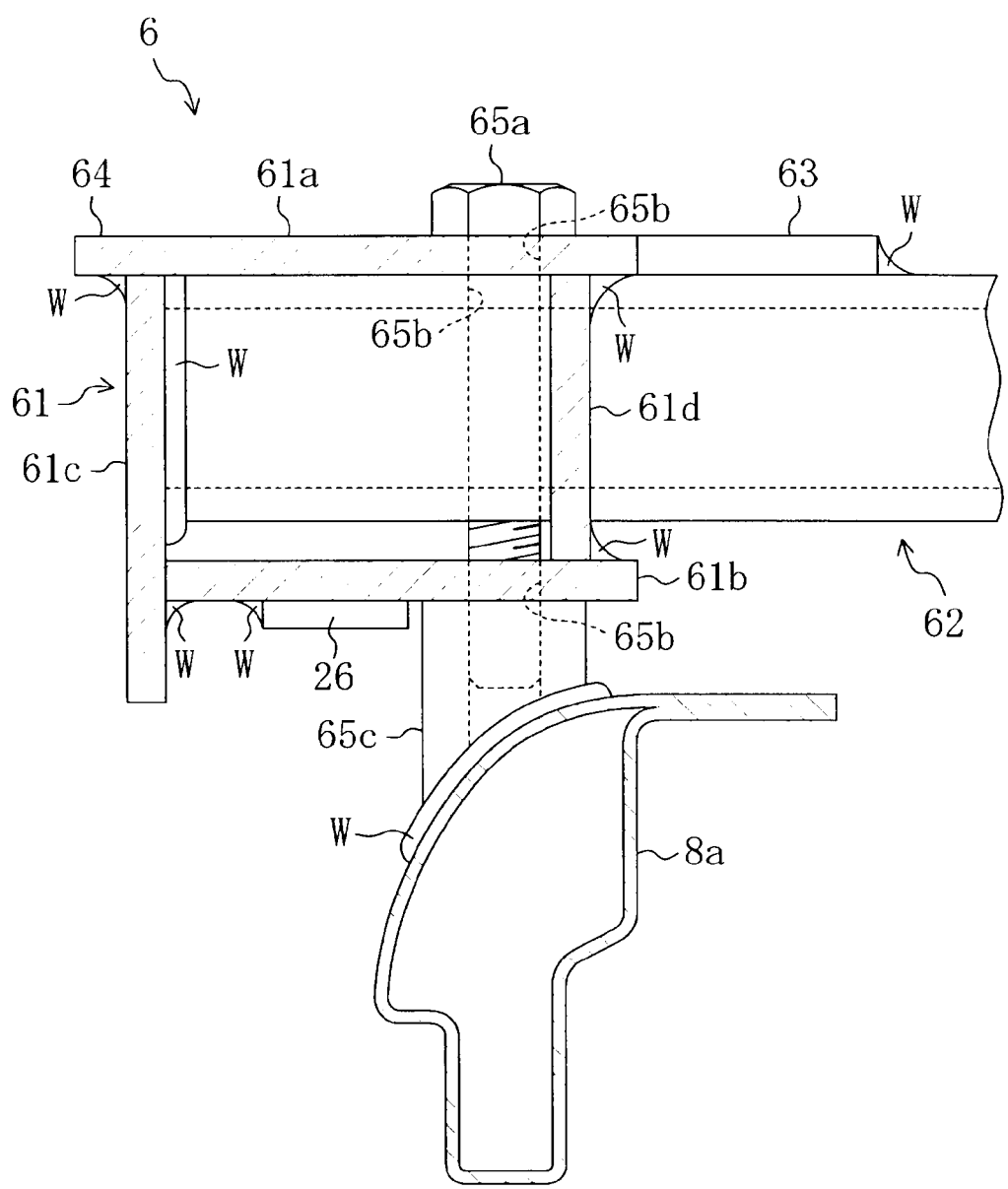
FIG. 4 is a sectional view taken from line X-X in FIG. 3.

More specifically, as shown also in FIG. 4, the first member 61 is formed in the shape of an elongated, relatively wide, hollow vessel by welding plural steel members together and it includes an upper wall portion 61a and a lower wall portion 61b both located along the upper pillar 8a, an outer wall portion 61c and an inner wall portion 61d both welded continuously to the upper wall portion 61a and the lower wall portion 61b, and a protective portion 25 the details of which will be described later. In the drawings, the reference mark W represents a welded position.

On the other hand, the second member 62 is constituted by a hollow steel pipe of a rectangular section which is often used. By thus using an integral widely-used part as the second member 62 which functions as a support rod, there accrues an advantage in point of rigidity, stability of quality, easiness of acquisition, and material cost.

A support flange portion 63 of a generally triangular shape in a plan view projects from the second member 62 side of the upper wall portion 61a and is welded to an upper surface of the second member 62. An end on the first member 61 side of the second member 62 is welded to an inner surface of the outer wall portion 61c.

A reinforcing arch portion 64 bulging in an arching line along the longitudinal direction of the first member 61 is provided on the other side of the first member 61 with respect to the second member 62. The support flange portion 63 and the reinforcing arch portion 64 are provided not only for firmly fixing both the first member 61 and second member 62 but also for transmitting a load imposed on the second member 62 dispersedly to the whole of the first member 61.

For example, in the reinforcing member 6 of this embodiment, as shown in FIG. 5, when a load of 17 tons is imposed on a projecting end of the second member 62 as indicated with an arrow, the load is not imposed locally but transmitted dispersedly to the front end side of the first member 61 and the rear end side thereof at a ratio of 7 tons and 10 tons.

Screwed portions 65 are provided at five predetermined positions of the reinforcing member 6 to fit the reinforcing member to the cabin 3 removably.

More specifically, bolt holes 65b are formed vertically as through holes, one in a front end portion, two in a rear end portion, and one in a central portion, in the longitudinal direction of the first member 61. Likewise, bolt holes 65b are formed vertically as through holes in both longitudinal end portions of the second member 62. The bolt hole 65b of the second member 62 formed on the first member 61 side overlaps the central bolt hole 65b of the first member 61 and thus both can be screwed at a time.

Boss portions 65c corresponding to the bolt holes 65b respectively are formed at a portion near the front pillar 7a of the right upper pillar 8a, a central portion thereof, and a portion near the rear pillar 9a thereof, and further at a central portion of the left upper pillar 8b (see FIG. 4). Bolts 65a inserted through the bolt holes 65b are screwed and fixed to the boss portions 65c in a removable manner respectively.

As shown in FIG. 6, in the reinforcing member 6 attached to the cabin 6, the outer wall portion 61c is positioned more outside than the right side face of the cabin 3 with a gap when seen in a plan view, and the projecting end of the second member 62 is positioned near the left side face of the cabin 3 to overlap the left side face of the cabin 3 or is positioned slightly inside the left side face.

By thus making the reinforcing member 6 removable it becomes possible to replace the reinforcing member 6 in accordance with the size of the hydraulic excavator, thus bringing about a high productivity. Besides, by screwing both end portions of the first member 61 and the second member 62, it is possible to fix the reinforcing member 6 firmly while suppressing a lowering in strength of the reinforcing member 6 caused by formation of the bolt holes 65, thus bringing about an excellent workability. The reason why the screwed portions 65 are provided at two positions of the rear end portion of the first member 61 is that rigidity is relatively strong around the rear pillar 9a because of the structure of the cabin 3 and it is intended to transmit more load thereto.

(Protective Portion 25)

A protective portion 25 is provided for the front of the first member 61 in order to surely prevent direct contact of the boom 5 with the cabin 3 and allow the reinforcing member 6 to bear the load.

More specifically, the protective portion 25 is provided so as to cover the range from a front end portion of the upper pillar 8a up to the upper end of the front pillar 7a and it includes a load bearing surface 25a continuous with the outer wall portion 61c, and a load bearing surface 25b continuous with both load bearing surface 25a and upper wall portion 61a.

As shown in FIG. 3, the load bearing surface 25a is disposed so as to be positioned between the boom 5 and the cabin 3 when the boom 5 tilts forward to a maximum extent at which the hydraulic excavator is most likely to fall down.

Thus, in any tilting position of the boom 5, because the outer wall portion 61c of the first member 61 and the load bearing surface 25a are positioned between the boom 5 and the cabin 3, the boom 5 does not strike against the cabin 3 directly.

(Displacement Preventing Portion 26)

As shown in FIGS. 4 and 6, displacement preventing portions 26 are provided near the screwed portions 65. The displacement preventing portions 26 are each formed by a block-like steel piece. For example, the displacement preventing portion 26 positioned in the center portion of the first member 61 is welded to a lower surface of the lower wall portion 61b and has a convex structure, that is, one end of the displacement preventing portion 26 is in proximity to a peripheral surface of the boss portion 65c at the working apparatus side. The displacement preventing portion 26 positioned on the projecting end side of the second member 62 is disposed so as to be in proximity to the opposite peripheral surface of the boss portion 65c with respect to the working apparatus. The displacement preventing portions 26 may be disposed on one side or both sides of each of the screwed portions 65.

[Action of Reinforced Structure]

As shown in FIG. 1 as example, the hydraulic excavator tends to fall down when the boom 5 is tilted forward to a maximum extent. In this state, as shown in FIG. 3, the boom 5 is positioned near the upper portion of the front pillar 7a of the cabin 3 when seen in a side view. Therefore, suppose the hydraulic excavator falls down from that state and the boom 5 contacts with the cabin 3, the boom 5 strikes against the upper front side of the cabin 3. However, as indicated with an arrow in FIG. 6, since the load bearing surface 25a of the protective portion 25 is present between the boom 5 and the cabin 3, the boom 5 strikes against the load bearing surface 25a and does not come into direct abutment against the front portion of the cabin 3 which is relatively low in rigidity.

On the other hand, the surface at the left side of the cabin 3 usually comes into contact with the ground from the upper side of the surface. However, as indicated with an arrow in FIG. 6, the load is particularly borne by the projecting end of the second member 62 which functions as a support rod.

Consequently, the loads applied to the cabin 3 from both right and left sides are borne by the reinforcing member 6 before greatly acting on the cabin 3. The loads are also dispersed efficiently to the right front pillar 7a, upper pillar 8a and rear pillar 9a of the cabin 3 through the second member 62 and the first member 61, so that a local deformation of the cabin 3 is suppressed and the rigidity of the cabin 3 is improved.

Particularly, since the second member 62 which functions as a support rod is positioned above the sitting position of the operator S and is supported firmly by the first member 61 which functions as a beam, the rigidity is strengthened especially around the operator S, and a space R is ensured in the interior of the cabin 3 as shown in FIG. 6.

Moreover, for example, when the boom 5 strikes against the first member 61 and a load is imposed on the first member 61, a shear force from the boom 5 side acts on the bolts 65a at the screwed portions 65. However, since the displacement preventing portions 26 are provided near the boom 5 side (right side), an excessive shear force is suppressed to act on the bolts 65a and therefore it is possible to effectively prevent the damage of the screwed portions 65, resulting in disengagement of the reinforcing member 6 from the cabin 3.

Likewise, by disposing the displacement preventing portions 26 also on the left side of the screwed portions 65, it is also possible to suppress an excessive shear action on the bolts 65a as a result of contact of the second member 62 with the ground.

Since the reinforcing member 6 of the present embodiment is screwed to the cabin 3 removably, only the provision of the boss portions 65c for the cabin 3 allows the reinforcing member 6 to be fitted to reinforce the cabin 3. Consequently, the cabin 3 can be used in common in both large-sized and small-sized hydraulic excavators. Thus, excellent versatility can be achieved.

Further, the reinforcing member 6 can be utilized in response to the necessity. For example, at a work site, e.g., a steep slant, where the hydraulic excavator is likely to fall down, the reinforcing member 6 is fitted to the cabin 3 to improve the safety, while at a flat work site where the hydraulic excavator is less likely to fall down, the reinforcing member 6 is removed to improve the workability and fuel consumption.

According to the reinforced structure for a cabin of the present invention, as set forth above, even if a working machine such as a hydraulic excavator falls down, the load is borne efficiently by the reinforcing member 6 and can be distributed to the cabin 3, so that the safety can be further improved. Besides, since nothing obstructs the front visual field of the cabin 3, the workability is improved. Productivity is also high because of a simple structure.

The reinforced structure for a cabin according to the present invention is not limited to the above embodiment, but involves various other structures.

For example, although, in the above embodiment, the front cross member 10 is disposed between the front window 17 and the roof window 22, the front window 17 and the roof window 22 may be made integrally without using the front cross member 10. In the structure, nothing obstacles the visual field in the range from the front of the operator S to the upper side. The workability is further improved.

The reinforcing member 6 may be made integrally with the cabin 3 by welding it to the cabin 3, for example. In this case, the rear side of the first member 61 may be made large so that the first member 61 serves also as the roof panel 23.

Although the invention has been described with reference to the preferred embodiments in the attached figures, it is noted that equivalents may be employed and substitutions made herein without departing from the scope of the invention as recited in the claims.

We claim:

1. A reinforced structure for a cabin of a working machine, comprising:
   the cabin being a box-shaped cabin, said cabin defining a working space for an operator;
   a working apparatus installed along said cabin and supported so that a longitudinal tilting motion thereof can be controlled; and
   a reinforcing member provided for said cabin,
   said cabin comprising:
   a pair of front pillars vertically disposed on both right and left sides of a front of said cabin;
   a pair of upper pillars continuous with upper ends of said front pillars respectively and disposed longitudinally on both right and left sides; and
   a pair of rear pillars continuous with rear ends of said upper pillars respectively and disposed vertically on both right and left sides,
   wherein said reinforcing member, comprises a first member located longitudinally between upper ends of said front and rear pillars located on said working apparatus side of said cabin, said first member being fixed to said upper pillar located on the same side, and
   a second member disposed transversely, one end thereof being fixed to an intermediate position of said first member, and the other end thereof being fixed to the other upper pillar.

2. The reinforced structure for a cabin of a working machine according to claim 1, wherein said second member is disposed above an operator seated within said cabin.

3. The reinforced structure for a cabin of a working machine according to claim 1, wherein a protective portion is disposed on a front of said first member so as to be positioned between said working apparatus and said cabin when said working apparatus tilts forward to a maximum extent.

4. The reinforced structure for a cabin of a working machine according to claim 1, wherein said reinforcing member is screwed to said cabin removably, and screwed portions of said reinforcing member are located at both end portions of said first member and both end portions of said second member.

5. The reinforced structure for a cabin of a working machine according to claim 4, wherein displacement preventing portions are provided near said screwed portions.

* * * * *